(12) United States Patent
Hartl et al.

(10) Patent No.: US 8,165,440 B2
(45) Date of Patent: Apr. 24, 2012

(54) LASER BASED FREQUENCY STANDARDS AND THEIR APPLICATIONS

(75) Inventors: Ingmar Hartl, Ann Arbor, MI (US); Martin Fermann, Dexter, MI (US)

(73) Assignee: IMRA America, Inc., Ann Arbor, MI (US)

( * ) Notice: Subject to any disclaimer, the term of this patent is extended or adjusted under 35 U.S.C. 154(b) by 0 days.

(21) Appl. No.: 13/028,249

(22) Filed: Feb. 16, 2011

(65) Prior Publication Data

US 2011/0134943 A1 Jun. 9, 2011

Related U.S. Application Data

(60) Continuation of application No. 12/825,446, filed on Jun. 29, 2010, which is a division of application No. 11/546,998, filed on Oct. 13, 2006, now Pat. No. 7,809,222.

(60) Provisional application No. 60/726,617, filed on Oct. 17, 2005.

(51) Int. Cl.
*G02B 6/00* (2006.01)
*G02B 6/036* (2006.01)
*G02B 6/26* (2006.01)
*G02B 6/42* (2006.01)
*H01S 3/098* (2006.01)
*H01S 3/13* (2006.01)

(52) U.S. Cl. ............ 385/122; 385/15; 385/126; 372/18; 372/29.023

(58) Field of Classification Search ................... 385/122, 385/15, 126; 372/18, 29.023
See application file for complete search history.

(56) References Cited

U.S. PATENT DOCUMENTS

| | | | |
|---|---|---|---|
| 5,121,400 A | 6/1992 | Verdiell |
| 5,359,612 A | 10/1994 | Dennis |
| 5,378,888 A | 1/1995 | Stappaerts |
| 5,379,309 A | 1/1995 | Logan |
| 5,566,196 A | 10/1996 | Scifres |
| 5,694,408 A | 12/1997 | Bott |
| 5,717,516 A | 2/1998 | Klein |
| 5,748,309 A | 5/1998 | van der Weide |
| 5,778,016 A | 7/1998 | Sucha |
| 5,854,865 A | 12/1998 | Goldberg |
| 5,946,130 A | 8/1999 | Rice |
| 6,038,055 A | 3/2000 | Hänsch |
| 6,061,170 A | 5/2000 | Rice |
| 6,072,811 A | 6/2000 | Fermann |
| 6,192,058 B1 | 2/2001 | Abeles |
| 6,233,085 B1 | 5/2001 | Johnson |

(Continued)

FOREIGN PATENT DOCUMENTS

JP 10022555 A * 1/1998

(Continued)

OTHER PUBLICATIONS

Tamura, et al., "Unidirectional ring resonators for self-starting passively mode-locked lasers," Optics Letters, vol. 18, No. 3, Feb. 1, 1993, pp. 220-222.

(Continued)

*Primary Examiner* — Ryan Lepisto
*Assistant Examiner* — Jerry Blevins
(74) *Attorney, Agent, or Firm* — Sughrue Mion, PLLC (57) ABSTRACT

Frequency standards based on mode-locked fiber lasers, fiber amplifiers and fiber-based ultra-broad bandwidth light sources, and applications of the same.

4 Claims, 8 Drawing Sheets

U.S. PATENT DOCUMENTS

| | | | |
|---|---|---|---|
| 6,366,356 B1 | 4/2002 | Brosnan | |
| 6,373,867 B1 | 4/2002 | Lin | |
| 6,396,856 B1 | 5/2002 | Sucha | |
| 6,400,871 B1 | 6/2002 | Minden | |
| 6,480,327 B1 | 11/2002 | Betin | |
| 6,570,704 B2 | 5/2003 | Palese | |
| 6,590,910 B2 | 7/2003 | Lin | |
| 6,597,836 B2 | 7/2003 | Johnson | |
| 6,654,394 B1 | 11/2003 | Sellin | |
| 6,678,288 B2 | 1/2004 | Rice | |
| 6,701,049 B1 * | 3/2004 | Awad et al. | 385/122 |
| 6,704,479 B2 | 3/2004 | Koplow | |
| 6,708,003 B1 | 3/2004 | Wickham | |
| 6,751,385 B2 | 6/2004 | Futami | |
| 6,766,075 B1 | 7/2004 | King | |
| 6,785,303 B1 | 8/2004 | Holzwarth | |
| 6,813,069 B2 | 11/2004 | Rice | |
| 6,813,429 B2 | 11/2004 | Price | |
| 6,813,447 B2 | 11/2004 | Ellis | |
| 6,814,376 B2 | 11/2004 | Yu | |
| 6,819,690 B2 | 11/2004 | Kartner | |
| 6,882,781 B2 | 4/2005 | Ionov | |
| 6,885,683 B1 | 4/2005 | Fermann | |
| 7,065,110 B2 | 6/2006 | Rice | |
| 7,107,795 B2 | 9/2006 | Cheo | |
| 7,120,175 B2 | 10/2006 | Rothenberg | |
| 7,130,133 B2 | 10/2006 | Sun | |
| 7,187,492 B1 | 3/2007 | Shay | |
| 7,190,705 B2 | 3/2007 | Fermann | |
| 7,202,993 B2 | 4/2007 | Tauser | |
| 7,203,402 B2 | 4/2007 | Hänsch | |
| 7,218,443 B2 | 5/2007 | Tauser | |
| 7,221,499 B2 | 5/2007 | Rice | |
| 7,224,518 B2 | 5/2007 | Tauser | |
| 7,233,433 B1 | 6/2007 | Shay | |
| 7,443,903 B2 | 10/2008 | Leonardo | |
| 2001/0054977 A1 | 12/2001 | Courtney | |
| 2002/0131164 A1 | 9/2002 | Palese | |
| 2003/0039015 A1 * | 2/2003 | Vujkovic-Cvijin et al. | 359/187 |
| 2003/0202547 A1 | 10/2003 | Fermann | |
| 2004/0057682 A1 | 3/2004 | Nicholson | |
| 2004/0161239 A1 | 8/2004 | Bruesselbach | |
| 2004/0190119 A1 | 9/2004 | Tauser et al. | |
| 2004/0213302 A1 | 10/2004 | Fermann et al. | |
| 2005/0047739 A1 | 3/2005 | Parker | |
| 2005/0063425 A1 | 3/2005 | Krastev | |
| 2005/0157969 A1 * | 7/2005 | Imajuku et al. | 385/1 |
| 2005/0169324 A1 | 8/2005 | Iiday et al. | |
| 2005/0225846 A1 | 10/2005 | Nati | |
| 2005/0238070 A1 | 10/2005 | Imeshev | |
| 2006/0263024 A1 | 11/2006 | Dong | |
| 2006/0268949 A1 | 11/2006 | Gohle | |
| 2007/0086713 A1 | 4/2007 | Hartl | |
| 2007/0201795 A1 | 8/2007 | Rice | |
| 2008/0069159 A1 | 3/2008 | Adel | |
| 2009/0201575 A1 | 8/2009 | Fermann | |

FOREIGN PATENT DOCUMENTS

| | | |
|---|---|---|
| WO | WO2004077142 A1 | 9/2004 |
| WO | WO2007034317 A2 | 3/2007 |
| WO | WO2009042347 A1 | 4/2009 |

OTHER PUBLICATIONS

Hong et al., "Broad-spectrum frequency comb generation and carrier-envelope offset frequency measurement by second-harmonic generation of a mode-locked fiber laser", Optics Letters vol. 28, No. 17 p. 1516-18 Sep. 1, 2003.

Tauser et al, "Amplified femtosecond pulses from an Er:fiber system: Nonlinear pulse shortening and self-referencing detection of the carrier-envelope phase evolution", Optics Express 11, 594-600 (2003).

Rauschenberger et al., Control of the frequency comb from a mode-locked Erbium-doped fiber laser, J. Rauschenberger, T. Fortier, D. Jones, J. Ye, S. Cundiff, Optics Express vol. 10 {fourth root}24, p. 1404, Dec. 2, 2002.

Tamura, et al., "77-fs pulse generation froma stretched-pulse mode-locked all fiber ring laser," Tamura, et al., Optics Letters, vol. 18, No. 13, Jul. 1, 1993, pp. 1080-1082.

Washburn, et al., A Phase Locked Frequency comb from an all-fibre supercontinuum source, B. Washburn, J. Nicholson, S.A. Diddams, M.F. Yan and N.R. Newbury, The 29th European Conference on Optical Communications, Sep. 22-24, 2003, Rimini, Italy (2003).

Apolonski A., et al., Controlling the Phase Evolution of Few-Cycle Light Pulses, Physical Review Letters, Jul. 24, 2000, vol. 85, No. 4, pp. 740-743.

A. Bartels, N. R. Newbury, I. Thomann, L. Hollberg, and S. A. Diddams, "Broadband phase-coherent optical frequency synthesis with actively linked Ti:sapphire and Cr:forsterite femtosecond lasers," Opt. Lett. 29, 403-405. (2004).

A. S. Bhushan et al. "150 Gsample/s wavelength division sampler with time-stretched output," Electron. Lett., vol. 34, No. 5, pp. 474-475, 1998.

Diddams et al., "An Optical Clock Based on a Single Trapped 199Hg+ Ion", Science 2001 293: 825-82.

K. W. Holman, D. D. Hudson, J. Ye, and D.J. Jones, "Remote transfer of a high-stability and ultralow-jitter timing signal," Opt. Lett. 30, 1225-1227. (2005).

R. Jason Jones et al. in "Precision stabilization of femtosecond lasers to high-finesse optical cavities", Physical Review A 69, 051803(R) (2004).

K. Kikuchi et al. "Highly-nonlinear bismuth oxide-based glass fibers for all-optical signal processing"OFC 2002, post deadline paper.

L-S. Ma et al "A New Method to Determine the Absolute Mode Number of a Mode-Locked Femtosecond-Laser Comb Used for Absolute Optical Frequency Measurements"IEEE Journal of Selected topics in quantum electronics, vol. 9, p. 1066 (2003).

J. J. McFerran et al in "Low-noise synthesis of microwave signals from an optical source," Electron. Lett. 41, 36-37 (2005).

T. Okuno et al. "Silica-Based Functional Fibers with Enhanced Nonlinearity and Their Applications"IEEE J. Sel. Top. Quantum Electron. 5, 1385 (1999).

T. R. Schibli, J. Kim, O. Kuxucu, J. T. Gopinath, S. N. Tandon, G. S. Petrich, L. A. Kolodziejski, J. G. Fujimoto, E. P. Ippen, and F. X. Kaertner, "Attosecond active synchronization of passively mode-locked lasers by balanced cross correlation," Opt. Lett. 28, 947-949 (2003.

F. Tauser, A. Leitenstorfer, and W. Zinth, "Amplified femtosecond pulses from an Er:fiber system: Nonlinear pulse shortening and self-referencing detection of the carrier-envelope phase evolution," Opt. Express 11, 594-600 (2003.

H. R. Telle et al. In 'Carrier-envelope offset phase control : a novel concept for absolute frequency measurement and ultrashort pulse generation', Appl. Phys. Lett., B69, 327-332 (199.

D. von der Linde "Characterization of the noise in continuously operating mode-locked lasers" Appl. Phys. B. vol. B 39 p. 201-217 (1986).

T.W. Hansch et al, Laser Frequency Stabilization by Polarization Spectroscopy of a Reflecting Reference Cavity, Optics Communications, vol. 35, No. 3, Dec. 1980, pp. 441-444.

Jones et al., "Stabilization of Femtosecond Lasers for Optical Frequency Metrology and Direct Optical to RadioSynthesis" R. Jason Jones and Jean-Claude Diels PRL 86, p. 3288 (2001).

Keilmann et al.,'Time domain mid-infrared frequency-comb spectrometer', Opt. Lett., vol. 29, pp. 1542-1544 (2004).

S. Cundiff, "Colloquium: Femtosecond optical frequency combs," Review of Modern Physics, vol. 75, p. 325-342 (Jan. 1, 2003).

S. Cundiff et al., "Femtosecond combs linewidth due to pulse dynamics in mode-locked laser," ThD4, pp. 719-720 Lasers and Electro-Optics Society, 2007. LEOS 2007. The 20th Annual Meeting of the IEEE.

S. Diddams, "Direct RF of optical frequency measurements with a Femtosecond laser comb," IEEE Transactions on Intrumentation and Measurement, vol. 50, Is.2, p. 552-555 (Apr. 1, 2001).

E. Ebendorff-Heidepriem et al., "Highly nonlinear bismuth-oxide-based glass holey fiber" presented at Optical Fiber Communications-OFC 2004, Los Angeles, California, paper ThA4.

F. Fatemi et al., "Frequency comb linewidth of an actively mode-locked fiber laser," Optics Letters, vol. 29, Issue 9, pp. 944-946 (2004).

K. Holman "Detailed studies and control of intensity-related dynamics of femtosecond frequency combs from mode-locked Ti: Sapphire Lasers," IEEE Journal of Selected Topics in Quantum Electronics, vol. 9, Is. 4, p. 1018-1024 (Jul. 1, 2003).

D. Jones, "Carrier-Evelope phase control of femtosecond mode locked lasers and direct optical frequency synthesis," Science Magazine (Nov. 7, 2003).

K. Kikuchi et al. "Highly-nonlinear bismuth oxide-based glass fibers for all-optical signal processing," Optical Fiber Communications OFC 2002, post deadline paper.

K. Kikuchi et al. "Highly-nonlinear bismuth oxide based fibers for all-optical signal processing," Electronics Letters vol. 38 No. 4, p. 166-167 Feb. 2002.

K. Minoshima, "Femtosecond-comb distance meter; ultrahigh-resolution distance measurement using a mode-locked laser," CLEO/Pacific Rim 2003-The 5th Pacific Rim Conference on Lasers and Electro-Optics THB (10), p. 394 Dec. 15-19, 2003.

Chan-Xiang Shi, "A novel Er-doped fiber laser with adjustable pulse output experiment", Microwave and Optical Technology Letters vol. 12, No. 1, May 1966 pp. 26-29.

Stewart et al., "A modelocking fiber laser system for Multi-Point Intra-cavity Gas Spectroscopy", Optical Fiber Sensors OFS 2002, p. 1-6.

Yi-Fei Chen et al., "Remote distribution of a mode-locked pulse train with sub 40-as jitter" Opt. Express 14, 12134-12144 (2006).

E. Cheung et al., 'Phase locking of a pulsed fiber amplifier', Opt. Soc. Conf. on Advanced Solid State Photonics, paper #WA2, (2008).

T. Y. Fan, 'Laser Beam Combining for High-Power High-Radiance Sources', IEEE J. Sel. Top. in Quantum Electronics, vol. 11, pp. 567 (2005).

J. W. Hardy et al., 'Real-time atmospheric compensation', J. Opt. Soc. Am., vol. 67, pp. 360 (1977).

H. Itoh et al., 'Femtosecond pulse delivery through long multi-mode fiber using adaptive pulse synthesis', J. J. Appl. Phys., vol. 45, 5761 (2006).

G. Lees et al., Q-switched erbium doped fibre laser utilising a novel large mode area fibre, G.Lees, D.Taverner, D.Richardson, L.Dong, T.Newson, Electronics Letters vol. 33 Is. 5 p. 393-394 (1997).

L. Michaille et al., 'Phase locking and supermode seletion in multicore photonic crystal fiber lasers with a large doped area, L.Michaille, C.Bennett, D.Taylor, T.Shepherd, J.Broeng, H.Simonsen, A.Petersson, Optics Letters, vol. 30 p. 1668 (2005).

T. R. O'Meara et al., 'The multidither principle in adaptive optics', J. Opt. Soc. Am., vol. 67, p. 306 (1977).

X. Shen et al., 'Compensation for multimode fiber dispersion by adaptive optics', Opt. Lett., vol. 30, 2985 (2005).

M.Wrage et al., 'Combined phase locking and beam shaping of a multicore fiber laser by structured mirrors', M.Wrage, P.Glas, M.Leitner, Optics Letters vol. 26 p. 980 (2001).

Burkhart et al., The National Ignition Facility Front-End laser System (Lawrence Livermore National Labs) 1st Annual Intnl Conf on lasers for application to Inertial Confinement Fusion, Monterey, CA May 30, 1995.

S. Augst et al., Coherent beam combining and phase noise measurements of ytterbium fiber amplifiers, Opt. Lett., vol. 29, pp. 474 (2004).

C. Bellanger et al., Coherent fiber combining by digital holography, Opt. Lett., vol. 33, No. 24, pp. 2937, Dec. 2008.

N. Broderick et al., Large mode area fibers for high power application, N. Broderick, H. Offerhaus, D. Richardson, R. Sammut, J. Caplen, L.Dong, Optical Fiber Technology vol. 5 p. 185-196 (1999).

* cited by examiner

OSA ———
Ext. InGaAs - - - -
(intensity uncalibrated)

LASER BASED FREQUENCY STANDARDS AND THEIR APPLICATIONS

CROSS REFERENCE TO THE RELATED APPLICATIONS

This application is a Continuation application of U.S. patent application Ser. No. 12/825,446 filed Jun. 29, 2010, which is a Divisional of U.S. patent application Ser. No. 11/546,998 filed Oct. 13, 2006, which claims benefit of Provisional Application No. 60/726,617, filed Oct. 17, 2005. The above-noted applications are incorporated herein by reference in their entirety.

BACKGROUND OF THE INVENTION

1. Field of the Invention

The invention relates to frequency standards based on mode-locked fiber lasers, fiber amplifiers and fiber-based ultra-broad bandwidth light sources, and applications of the same.

2. Description of the Prior Art

Mode-locked fiber lasers have several advantages over both mode-locked bulk solid state lasers and mode-locked diode lasers. Mode-locked fiber lasers offer typically superior noise properties compared to mode-locked diode lasers and can be packaged in smaller spaces than mode-locked bulk solid state lasers. Mode-locked fiber lasers can be produced with excellent thermal and mechanical stability. Passively mode-locked fiber lasers in particular can be constructed with few and inexpensive optical components, suitable for mass production, as disclosed in patent publication US 2004/0213302 to Fermann et al.

The dispersion compensated fiber lasers as disclosed by Fermann et al. allow the construction of low noise frequency comb sources. The incorporation of highly nonlinear Bi-fibers was further suggested to minimize the noise of such sources. In addition Fermann et al. disclosed the design of fiber lasers operating at repetition rates in excess of 1 GHz.

Low-noise operation of fiber lasers minimizes their timing jitter, allowing optimized control of the timing of the pulses. In contrast, other prior art modelocked fiber lasers are either limited in repetition rate or achievable timing jitter.

Generally, the noise background in fiber lasers can be minimized by operating well above threshold. Hence, modelocked fiber lasers enabling the oscillation of high energy pulses are very beneficial. Such high pulse energy fiber lasers were previously described in U.S. application Ser. No. 11/109,711 to Fermann et al. based on the oscillation of near parabolic pulses inside a positive dispersion fiber laser cavity. An optimum in pulse stability is then obtained by the incorporation of bandpass filters into the cavity. As mentioned in U.S. application Ser. No. 11/109,711 the bandpass filtering action can also come from the gain medium. The benefits of using parabolic pulses inside modelocked fiber lasers were later reiterated in US patent application 2005/0169324 to Ilday et al. The lack of any bandpass filters in these systems restricts the operation of such systems to parabolic fiber lasers operating close to the zero dispersion point and can lead to pulse stability problems.

The '302 publication constituted the first low noise fiber-based frequency comb source. Here low noise operation was obtained by controlling the fiber cavity dispersion in a certain well-defined range. Low noise operation of fiber frequency comb sources is generally required in order to enable stable locking of the carrier envelope offset frequency $f_{ceo}$ of the laser. For example, early work on fiber frequency comb lasers as disclosed in F. Tauser, A. Leitenstorfer, and W. Zinth, "Amplified femtosecond pulses from an Er:fiber system: Nonlinear pulse shortening and self-referencing detection of the carrier-envelope phase evolution," Opt. Express 11, 594-600 (2003) did not allow locking of $f_{ceo}$ of the laser. Other related work by Tauser et al. in US patent publication 2004/0190119 also does not teach a method of producing a low noise frequency comb source.

SUMMARY OF THE INVENTION

Compact frequency comb lasers are constructed using ultrafast laser sources in conjunction with highly nonlinear waveguides, such as Bi-fibers, silicon waveguides and periodically poled lithium niobate (PPLN) as examples. Specific nonlinear gratings written into such waveguides can produce enhanced power in certain narrowband spectral regions within a broadband spectrum, which is highly beneficial for the use of these devices in metrology applications. The use of nonlinear waveguides allows the operation of frequency comb lasers at high pulse repetition frequencies (PRF) with reduced power requirements.

Increasing the repetition rate of a modelocked oscillator, results in an increase in the power in each tooth inside the frequency comb, which has significant advantages in actual applications of such combs. For example, in optical frequency metrology this leads to higher energy radio frequency beat signals when beating the frequency comb with an unknown optical signal. Moreover, increasing the pulse repetition rate of a mode-locked oscillator also increases the optical mode spacing. This is an important benefit for frequency comb applications as explained below.

In frequency comb based optical frequency metrology, the frequency of the light source to be measured has either to be known with accuracy better than the mode spacing of the frequency comb used or the measurement has to be taken at multiple PRFs as disclosed in L-S. Ma et al "A New Method to Determine the Absolute Mode Number of a Mode-Locked Femtosecond-Laser Comb Used for Absolute Optical Frequency Measurements" IEEE Journal of Selected Topics in Quantum Electronics, Vol. 9 p 1066 (2003). In both cases a PRF (or equivalently a mode spacing) of larger than 100 MHz is advantageous: for the first method, wave-meter technology as typically used to predetermine the wavelength of the unknown source is not readily available with a resolution better than 100 MHz. For the second method the requirements of the necessary PRF detuning to be able to determine the mode number is relaxed at higher PRF.

The phase noise of the frequency comb source can be further reduced by using highly nonlinear bismuth oxide based fibers with positive dispersion for supercontinuum generation. In such a system Raman solitons which are known to have large phase noise are suppressed.

For the application of photonic analog-to-digital conversion of high speed electrical signals a high PRF laser source with low timing jitter is necessary which can be provided by this invention.

A high PRF laser source with low timing jitter has also advantages for femtosecond laser optical comb based distance metrology when using self beat down technology as disclosed by Minoshima et al. in "Study on cyclic errors in a distance measurement using a frequency comb generated by a mode-locked laser", Conference on Lasers and Electro-optics 2004, paper CTuH6. To enhance the distance resolution in femtosecond laser frequency comb based distance metrology a high harmonic of the PRF at typically 10 GHz is used for detection. To minimize cyclic error, adjacent harmonics to the harmonic used for detection need to be suppressed by more than 20 dB. A high PRF laser source relaxes the requirement for the bandwidth of the RF filter used in the detection system. A suitable laser source can be provided by this invention.

Low phase noise, high PRF fiber systems also allow the construction of fiber lasers in the whole telecom band in the 1.50-1.65 μm wavelength region and their application to optical sampling as well A/D conversion.

Other applications of low phase noise, high PRF fiber systems comprise wave meters, optical clocks, and sources of pulse trains with absolute phase stability. Low phase noise, high PRF fiber systems can further be effectively applied for the comparison of frequency standards at different locations or the transport of frequency standards along fiber transmission lines. To minimize the loss of frequency precision along fiber transmission lines, schemes for length control of the fiber transmission lines as well as signal repeaters using local oscillators can be implemented.

DETAILED DESCRIPTIONS OF SPECIFIC EMBODIMENTS

For most applications of frequency combs, low noise operation of frequency comb lasers is preferred. Low noise dispersion compensated frequency comb sources are described in Fermann et al. '302, which is herein incorporated by reference. Applications of frequency comb sources as described in Fermann '302 greatly benefit from the availability of frequency combs that actually span more than one octave in the optical frequency spectrum.

Figure 1A:
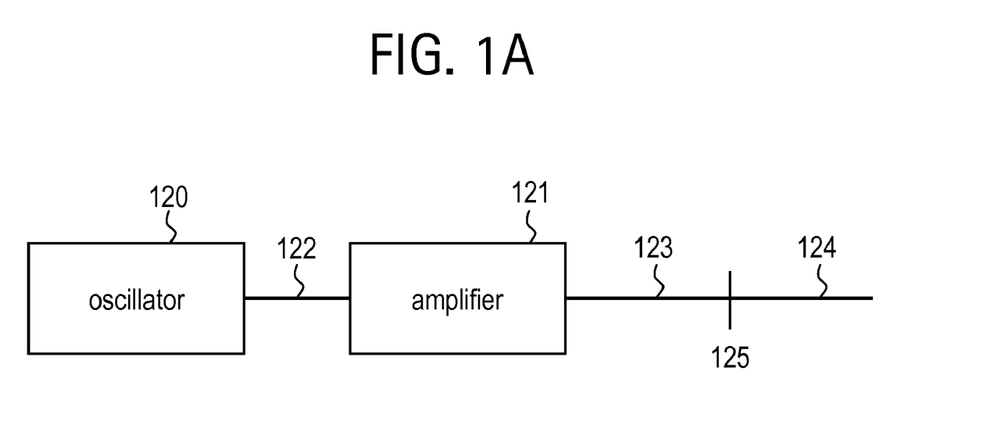
FIG. 1a) is a diagram of a generic spectral supercontinuum source according to an embodiment of the invention.

The generic design for an octave spanning comb source is shown in FIG. 1a. Such an octave spanning source typically comprises a modelocked fiber oscillator, whose output is further amplified in additional fiber amplifiers, where the amplified output is then injected into highly nonlinear fibers. An octave spanning spectrum typically is achieved once the output from the oscillator reaches the highly nonlinear fiber.

Here, oscillator 120 represents an oscillator design as previously described in the '302 publication. However, any other oscillator design, including modelocked bulk solid-state laser oscillators, modelocked diode lasers or mode-locked waveguide lasers may also be implemented. The oscillator output is amplified in amplifier 121, which can be constructed from a fiber or, more generally, a waveguide amplifier. For high power systems, the amplifier 121 can also be omitted. Fiber pigtail 122 connects oscillator 120 and amplifier 121. The output from amplifier 121 is obtained via pigtail 123 and is coupled into highly nonlinear fiber (or waveguide) 124 via splice 125. It is preferable to minimize the pulse length at splice 125 to maximize the spectral broadening in fiber 124. The pulse length can be minimized by the insertion of appropriate dispersion compensating fiber segments between the oscillator and amplifier or after the amplifier output, as discussed in the publication to Fermann et al. Specific design examples are therefore not further described here. To maximize spectral broadening in segment 124 while adding a minimum of noise, preferably a dispersion engineered holey Bi fiber with slightly positive dispersion is implemented. Dispersion engineering can be implemented by the incorporation of air-holes into the fiber cladding.

Bismuth oxide based highly nonlinear fibers have been discussed in K. Kikuchi et al. "Highly-nonlinear bismuth oxide-based glass fibers for all-optical signal processing" OFC 2002, post deadline paper. One advantage of the use of Bismuth oxide over silica based fibers is the positive dispersion of the fiber at around 1.5 um. Spectral broadening in positive dispersion fiber avoids Raman soliton formation which is known to introduce excess noise. Excess noise limits the performance of frequency comb sources. Another advantage of highly nonlinear Bismuth oxide fiber is the higher non-linearity compared to standard silica based fiber, maximizing the amount of spectral broadening.

Dispersion engineering of microstructured Bismuth oxide fiber further increases its nonlinearity. Dispersion engineering can reduce the dispersion of Bi-fibers, maximizing spectral broadening at low pulse energies as generated with high repetition rate pulse sources.

As discussed in the '302 publication, the use of low noise pump lasers is preferred for frequency comb lasers, since noise of the pump laser leads to excess noise in the modelocked oscillator. This is especially important for noise at spectral frequencies below the lifetime of the active laser transition in the modelocked oscillator where no filtering action of the laser medium is present. Pump lasers ideally operate in a single longitudinal mode. Pump laser noise may be reduced either by active noise cancellation via acousto-optical modulators or passively by diode pumping a cw solid state laser which is used as pump laser for the modelocked fiber oscillator. In the latter scheme the cw-laser acts as a low pass filter and pump diode noise above the lifetime of the laser transition of the cw-laser is greatly reduced.

The coupling of external pump lasers to fiber lasers and the use of acousto-optical modulators for noise cancellation is well known in the state of art and is not further discussed here.

Also any mechanical perturbation of the pump fibers and also the oscillator fibers must be avoided since they can couple to the optical frequencies of the system output and lead to excess noise. Ideally all fibers are mounted so as to be acoustically isolated.

As further discussed in the '302 publication, the carrier envelope offset frequency $f_{ceo}$ is conveniently controlled by modulation of the oscillator pump power that is injected to the modelocked oscillator. Any perturbation of the laser action induced by modulation of the oscillator pump power is low pass filtered by a time constant related to the upper laser level lifetime of the laser medium used for the oscillator. Therefore to electronically control the carrier envelope offset frequency with a high bandwidth, an upper laser level with a short spontaneous emission life-time is preferred. For the case of an Er fiber laser, the relevant laser level is the $^4I_{13/2}$ transition to the ground state. In standard Er-doped silica fiber the $^4I_{13/2}$ level has a spontaneous emission life-time of 10 ms. In contrast in Bi-fiber, a spontaneous life-time of 3 ms can be achieved. Hence the construction of fiber comb sources based on modelocked Er Bi-fiber oscillators based on Er-doped Bi-glass allows for the electronic reduction of the noise in the carrier envelope offset frequency compared to a frequency comb system based on Er-doped silica fiber.

For the same reason, Yb, Nd or Tm doped silica fiber, with spontaneous emission life-times of 1 ms, 0.5 ms and 0.025 ms respectively allow for even higher bandwidth control of the carrier envelope offset frequency.

In addition to Bi-fibers or holey Bi-fibers, Bi-waveguides, silicon waveguides or other highly nonlinear waveguides such as waveguides written into $LiNbO_3$ can be used for spectral broadening. To minimize coupling losses between segments 123 and 124, a highly nonlinear silica fiber can be used in place of segment 123, while segment 124 can be a highly nonlinear Bi-fiber.

Figure 1B:
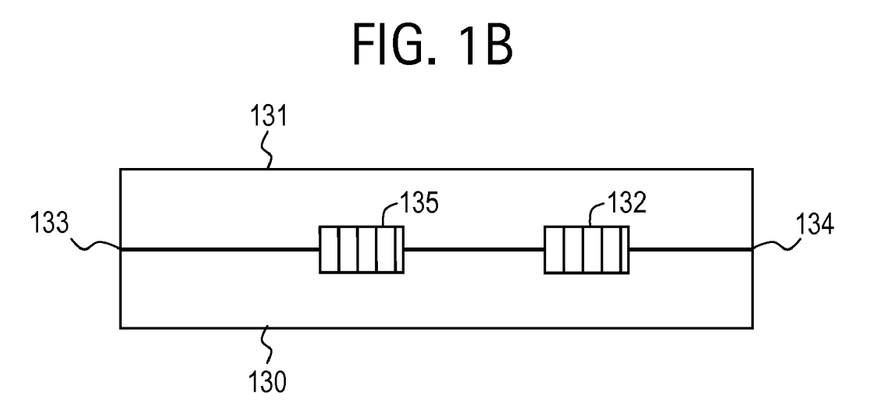
FIG. 1b) is a diagram of a highly nonlinear waveguide incorporating several frequency conversion sections according to an embodiment of the invention.

Highly nonlinear $LiNbO_3$ waveguides have the further advantage that nonlinear spectral broadening can be combined with the construction of an interferometer as required for phase control of passively modelocked lasers. The basic principles of operation of an interferometer for carrier envelope phase detection were first discussed by H. R. Telle et al. in 'Carrier-envelope offset phase control: a novel concept for absolute frequency measurement and ultrashort pulse generation', Appl. Phys. Lett., B69, 327-332 (1999) and are described also in the '302 publication to Fermann et al. The generic design of a highly nonlinear $LiNbO_3$ waveguide in conjunction with an f-2f interferometer is shown in FIG. 1b. The $LiNbO_3$ substrate contains waveguide 131 and a frequency conversion section 132 based on periodic poling. The light is coupled into end face 133 and extracted via end face 134. Self-phase modulation, cascaded second-order nonlinearities and other nonlinear processes in waveguide section 131 produce a greatly broadened optical spectrum. To enhance the spectral broadening effect, a periodically poled section 135 can be implemented close to the endface 133 of the waveguide. The poling period and grating length can be optimized for the desired broadening mechanism. Multiple poling periods or chirped gratings are also possible. The implementation of these gratings are state of the art and need no further discussion. A part of the broadened spectrum $A_0(\omega)$ can be frequency doubled in section 132 to produce a signal at $A(2\omega)$. The frequency doubled spectral component $A(2\omega)$ can then interfere with the non-converted spectral component $A_0(2\omega)$ to produce a beat signal between the doubled and non-converted spectral components. This beat signal can in turn be used to control the absolute phase of the modelocked oscillator upstream of the nonlinear waveguide. Alternatively difference frequency mixing can also be used in section 132 to produce a beat signal between frequency-converted and non-converted spectral components. For difference frequency mixing, a high frequency spectral component $A_0(2\omega)$ couples with a low frequency component $A_0(\omega)$ to produce a frequency down-converted signal at $A(\omega)$. The beat-signal then results from interference between the signals $A_0(\omega)$ and $A(\omega)$.

An octave spanning spectrum is not required when incorporating an 2f-3f interferometer. For example the red part of the continuum can be frequency tripled and interfered with the frequency doubled blue part of the continuum. Such implementations are well known from continuum generation in highly nonlinear fibers and are not further discussed here.

Instead of periodic poling, parasitic nonlinearities inside the $LiNbO_3$ waveguide can also be utilized for harmonic conversion of spectral regions of the continuum. To simplify coupling, the waveguide may also include tapered sections close to the end face. This allows mode-matching to butt coupled single mode fibers. The mode field diameter at the waveguide end-face is matched to the fiber mode field diameter and is then adiabatically reduced to enhance nonlinearities.

Figure 1C:
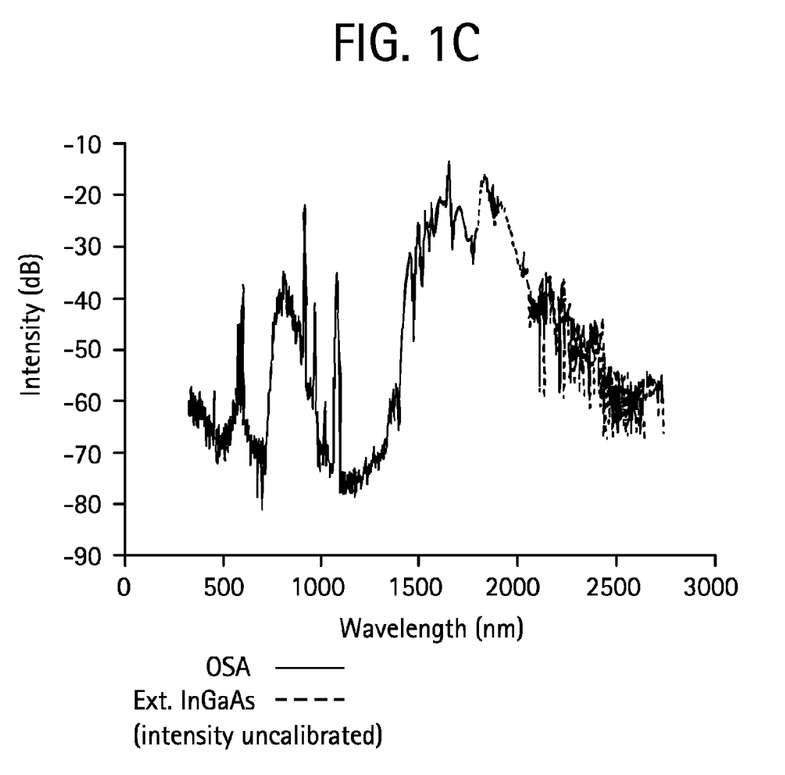
FIG. 1c) is a representative plot of a supercontinuum generated in a PPLN waveguide.

The spectrum of a supercontinuum generated in a PPLN waveguide is shown in FIG. 1c. To obtain the supercontinuum, 50 fs pulses from an Er amplifier with a pulse energy of 2.5 nJ were coupled into the waveguide. A broad continuum covering the spectral region from 500 nm to 2500 nm is clearly visible. The supercontinuum spectrum has several narrow spectral spikes in the 1000 nm wavelength region. These spectral spikes are created when frequency doubling the continuum near 2000 nm. To obtain the narrow spectral output in the 1000 nm spectral region a poling period of 26.5 µm was implemented. Secondary spikes arise from frequency doubling to higher order modes which could be eliminated with an all-single mode design. By appropriately designing the poling period of the $LiNbO_3$ waveguide, (i.e. by appropriately designing the PPLN grating period), enhanced spectral density can be obtained at very well specified spectral points. Moreover, as shown in FIG. 1b, several grating periods can be written into a PPLN waveguide, thus allowing for the simultaneous generation of several regions of enhanced spectral density. Such regions of high spectral density in the continuum are very useful in frequency metrology applications when comparing the continuum output to the output of an optical reference signal as explained with regards to FIGS. 3 and 4 below.

Figure 1D:
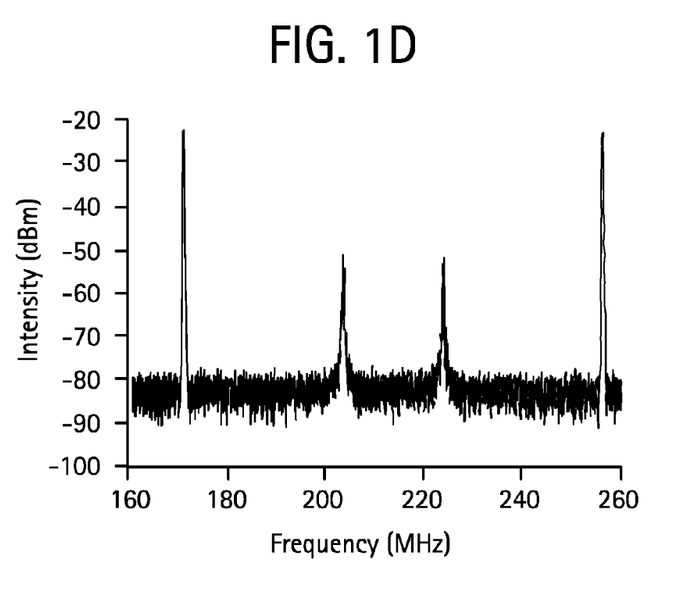
FIG. 1d) is a representative plot of an RF spectrum showing $f_{ceo}$ beat signals within the supercontinuum generated in a PPLN waveguide when using a modelocked fiber laser.

A beat signal between the frequency doubled portion of the supercontinuum near 1400 nm and the frequency tripled portion of the supercontinuum near 2100 nm was observable at 700 nm. This beat signal can be related to the evolution of the carrier envelope offset frequency of the oscillator and can be used for phase locking of the carrier envelope of the pulses inside the oscillator. An RF spectrum of the output near 700 nm measured with a fast photo-diode is shown in FIG. 1d. The beat signals near 205 MHz and 225 MHz arise from evolution of the carrier envelope phase inside the modelocked laser.

Figure 2:
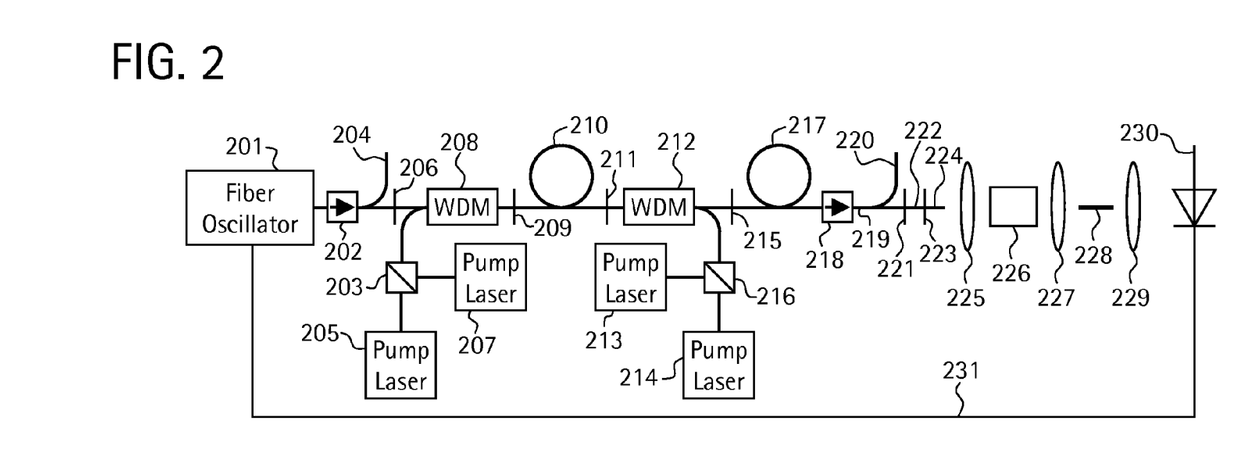
FIG. 2) is a diagram of a carrier envelope phase-locked frequency comb source according to an embodiment of the invention.

The fiber laser and amplifier systems as discussed above can conveniently be used in low-noise, high repetition rate frequency comb sources. FIG. 2 shows a frequency comb source based on a mode-locked Er-doped bismuth oxide fiber oscillator 201. Such modelocked oscillators were previously described in the '302 publication and can be constructed by replacing the active Er silica fiber with the Er bismuth oxide fiber. No further discussion is required at this stage. However, silica based fiber oscillators based on low-dispersion cavity designs could also be implemented. Because of the low noise of parabolic pulse oscillators, parabolic pulse oscillators as described in the '711 patent can also be used.

The oscillator output is amplified by the active element 210 which consists of Er or Er/Yb doped silicate or Bismuth oxide fiber. The oscillator, amplifier and the amplified output 219 may be isolated by isolators 202 and 218. Part of the oscillator power may be output coupled by a fused fiber coupler to the output 204 which can be used to detect and stabilize the PRF of the oscillator with feedback loops, or for further additional optical amplifiers. Alternatively the output 220 can be used for PRF detection and stabilization. The amplifier is optically pumped by fiber coupled laser diodes 205,207,213,214 which may be polarization multiplexed by the polarizing beam combiners 203 and 216. The pump light is coupled into the active fiber by WDM couplers 208 and 212. An additional fiber 217 can be used for dispersive pulse compression. Part of the amplified light can be output coupled by a fiber coupler or a WDM coupler (not separately shown) to the output 220.

For carrier envelope offset phase slip detection and feedback stabilization several schemes can be used, as discussed in H. R. Telle et al. "Carrier-envelope offset phase control: A novel concept for absolute optical frequency measurement and ultrashort pulse generation" Appl. Phys. B 69, 327-332 (1999), and as discussed also in the '302 publication. When implementing an f to 2f interferometer for carrier envelope phase control, an octave spanning spectrum is required, which is conveniently generated in a highly nonlinear fiber as discussed above. Highly nonlinear silica based fibers were discussed in T. Okuno et al. "Silica-Based Functional Fibers with Enhanced Nonlinearity and Their Applications" IEEE J. Sel. Top. Quantum Electron. 5, 1385 (1999).

The f to 2f interferometer is realized by a group delay compensating fiber 224, a second harmonic generation crystal 226, a delivery fiber 228, relay optics 225, 227 and 229 and a photo detector 230.

Part of the optical comb output can be extracted by fusion couplers or bulk optics after the nonlinear fiber 222, after the group delay compensating fiber 224 or at the delivery fiber 228. The fusion splices 206,209,211,215,221 and 223 connect the different optical elements or fibers.

For self referencing carrier envelope offset phase slip stabilization the beat signal at the detector 230 is fed back to the oscillator by electrical control loop 231. The electrical control loop is realized as a phase locked loop which compares the beat signal frequency $f_{CEO}$ with a reference signal. In a preferred embodiment the reference signal is a fraction of a multiple of the oscillator PRF. In another embodiment the reference signal is an RF oscillator phase locked to a frequency standard, for example a GPS synchronized Cesium or Rubidium Clock. Phase locked loops and GPS synchronized Cesium and Rubidium clocks are well known and need no further description.

To control the carrier envelope offset frequency, the oscillator pump power, the fiber Bragg grating temperature or stress and the saturable absorber temperature can be modified. Such schemes were already discussed in '302 and are not further described here. The temperature of a saturable absorber can be controlled by mounting the saturable absorber on a heat sink and stabilizing the temperature of the heat sink. Such schemes are well known in the state of the art and need no further explanation.

For several applications the PRF of the self referenced oscillator needs to be phase locked to a reference oscillator. This is done by a second control loop. The PRF of the laser can be detected at the detector 230 or preferably with a second photodiode at output port 204 or output port 220. The control loop uses preferably a high harmonic of the PRF as input signal and a low phase noise RF oscillator locked to a frequency standard as reference signal. High harmonics of the PRF can be detected due to intermodal beating of the frequency comb. As discussed in D. von der Linde "Characterization of the noise in continuously operating mode-locked lasers" Appl. Phys. B. vol. B 39 p. 201-217 (1986) oscillator phase noise is dominant in high harmonics of the PRF. Therefore a stabilization loop which uses high harmonics of the oscillator as input signal and is referenced to a low phase noise RF reference oscillator leads to reduced phase noise of the optical comb. The control signal for the PRF stabilization is fed back to the fiber oscillator. The PRF of the fiber oscillator can be tuned by changing the cavity length using Piezoelectric actuators as discussed in '302. Additionally PRF tuning by stretching or heating of the oscillator fiber is possible as also discussed in '302.

Figure 3:
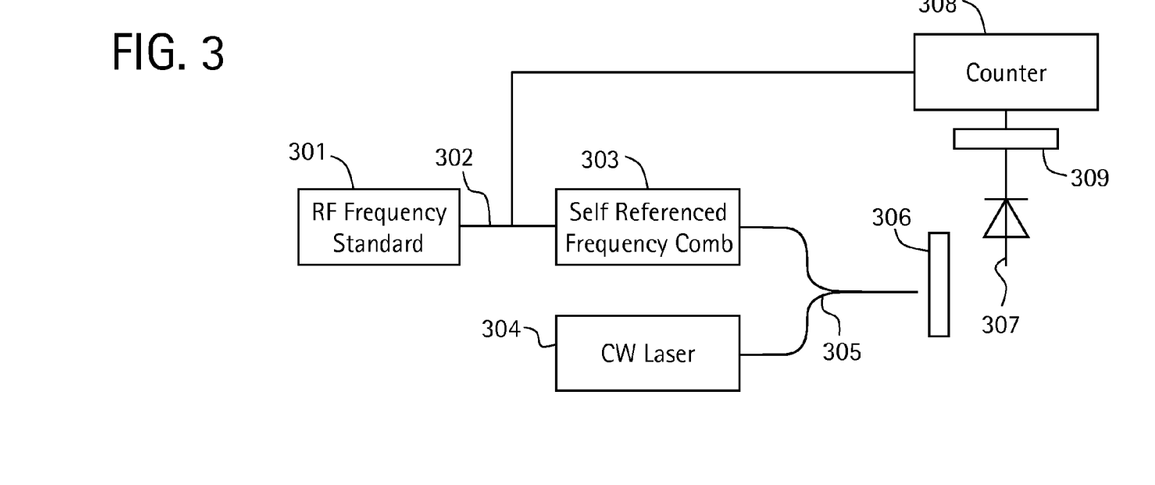
FIG. 3) is a diagram of an optical wave meter according to an embodiment of the invention.

FIG. 3 shows a generic embodiment of an optical wave meter based on a self-referenced optical fiber frequency comb source. PRF and $f_{CEO}$ of the optical frequency comb 303 are locked to RF clock 301 which can be for example a GPS synchronized Cesium or Rubidium clock. A cw laser 304 whose optical frequency is to be determined is combined with the optical frequency comb in a fiber optic combiner 305. The beat signal between the frequency comb and the cw laser is detected by a photodiode 307. To improve the signal to noise ratio of the beat signal, an optical band pass filter 306 which is centered at the wavelength of laser 304 and an electrical band pass filter 309 which is centered at the beat frequency are inserted in the optical and electrical signal paths. The signal/noise ratio can further be maximized by providing regions of enhanced spectral intensity overlapping with the spectral output of the cw laser. Such regions of enhanced spectral intensity can be for example obtained in the supercontinuum output of appropriately designed highly nonlinear PPLN waveguides, as explained above with regards to FIG. 1*b*).

The frequency of the beat signal $f_{beat}$ is counted by a frequency counter 308 which is referenced to the RF clock 301. The absolute frequency of laser 304 is determined by $f = \pm f_{CEO} + n \ast PRF \pm f_{beat}$. The unknown signs of $f_{CEO}$ and $f_{beat}$ as well as the mode number n can be determined by repeated measurements of $f_{beat}$ at slightly different PRF and $f_{CEO}$ as described in L-S. Ma et al "A New Method to Determine the Absolute Mode Number of a Mode-Locked Femtosecond-Laser Comb Used for Absolute Optical Frequency Measurements" IEEE Journal of Selected topics in quantum electronics, Vol. 9 p 1066 (2003). The mode number n can be determined alternatively by measuring the frequency of laser 304 by a conventional Fabry Perot type wave meter with resolution better than the frequency comb spacing which is equal to the oscillator PRF.

As disclosed by Diddams et al., "An Optical Clock Based on a Single Trapped 199Hg+ Ion", Science 2001 293: 825-828 a self referenced optical frequency comb can be used as an optical clock if one comb line is phase locked to an optical frequency standard. However in this publication a self-referenced optical comb based on a bulk Ti:Sapphire laser was used. The Ti:sapphire laser based comb has several disadvantages such as low long term stability, bulkiness, large size and large power consumption.

Figure 4:
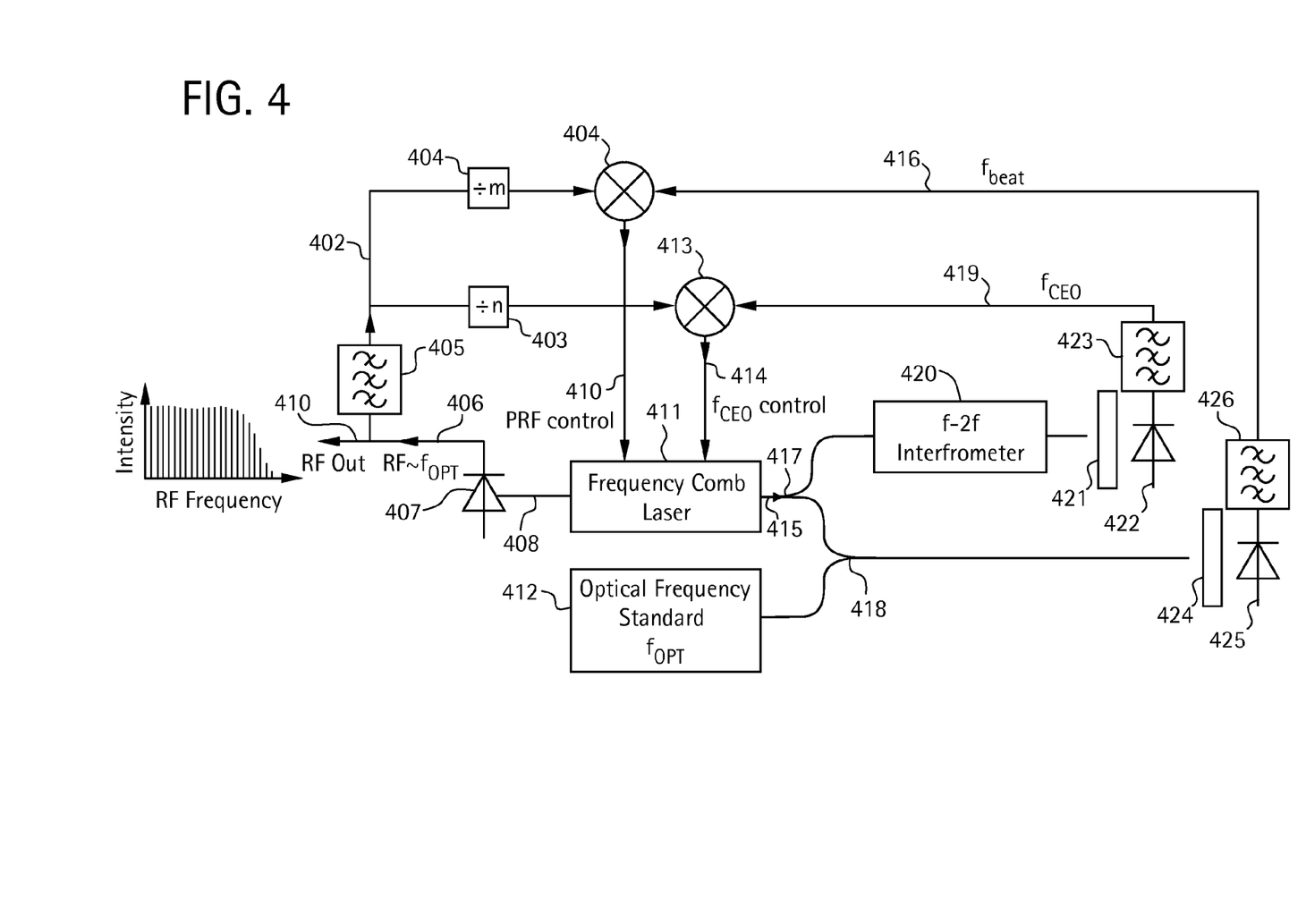
FIG. 4) is a diagram of an optical clock according to an embodiment of the invention.

FIG. 4 shows the embodiment of an optical clock using the self referenced fiber laser based optical frequency comb 411. The frequency comb system 411 was described with respect to FIG. 2. The optical output of the self referenced fiber laser based frequency comb 411 is combined by a fused fiber combiner 418 with the output of an optical frequency standard 412 operating at the frequency $f_{OPT}$. Optical frequency standards consist typically of a cw laser which is locked to an ultra-stable high-Q optical cavity and stabilized to an atomic or molecular transition and are well known in the field. The PRF of the oscillator and its harmonics generated by intermode beating are detected by a photodetector 407 at the optical output 408 which can be implemented by output port 204 or 220 of the frequency comb laser illustrated in FIG. 2. Alternatively one of the photodetectors 422 or 425 can be used for PRF detection. The detected signal containing the PRF frequency and its harmonics is an exact fraction of $f_{OPT}$. Part of the RF output is used as reference signal 402 for the feedback loops. A bandpass filter 405 can be implemented to select the k-th harmonic of the PRF as a reference signal.

With the first feedback loop the carrier envelope offset frequency $f_{CEO}$ is phase locked to a fraction n of the reference signal using the f-2f interferometer 420, the optical bandpass filter 421, the photodetector 422, the RF bandpass filter 423, the phase detector and loop filter 413 and the divider 403. The phase detector and loop filter 413 generates an error signal 414 which is fed back to control the CEO phase slip of the frequency comb laser. With this feedback loop in place $f_{CEO}$ is stabilized to $f_{CEO}=\pm k/n*PRF$. The second feedback control loop is used to phase lock the optical comb line which is closest to $f_{OPT}$ to $f_{OPT}$ plus a small RF offset $f_{beat}$. The beat signal $f_{beat}$ between the frequency comb and the optical frequency standard is detected by a photodiode 425. The second feedback loop is constructed similar to the first feedback loop. To improve the signal to noise ratio of the beat signal an optical band pass filter 424 which is centered at the wavelength of the optical frequency standard 412 and an electrical band pass filter 426 which is centered at the beat frequency are inserted in the optical and electrical signal paths. The phase detector and loop filter 409 generates the error signal 410 by measuring the phase difference of the beat signal and a fraction m of the reference signal. The error signal 410 is used to control the PRF of the frequency comb laser. With both feedback loops in place the PRF of the frequency comb laser is in fixed relation to $f_{OPT}$ with $$PRF = f_{OPT}/(l \pm k/n \pm k/m)$$

where l is a large integer representing the mode number of the frequency comb mode closest to $f_{OPT}$. The signs in the above equation can be determined by changing n and m. Other embodiments of an optical clock may include additional RF or optical amplifiers, tracking oscillators and other electronic controls. Other embodiments may also include frequency conversion stages (e.g., second harmonic generation) to overlap the output spectrum of the frequency comb with the optical frequency standard. In another embodiment the optical output 408 of the frequency comb laser might be also used for optical transmission of time and frequency information.

As disclosed by J. J. McFerran et al in "Low-noise synthesis of microwave signals from an optical source," Electron. Lett. 41, 36-37 (2005) the above setup can also be used as a low noise RF signal source. For the application as a low noise RF signal source, the long term stability requirements are typically relaxed and the optical frequency standard can be implemented as a cw laser locked to a stable high-Q cavity. Low noise RF sources are needed in several technological areas including navigation, radar, remote sensing, high speed electronics, clock distribution, and communications. Frequency-comb systems used in those applications need to be compact and rugged to be suitable for portable instrumentation without compromising stability. The implementation disclosed in the above publication uses Ti:Sapphire laser technology which has the previously described disadvantages and is not compatible with portable instrumentation. For low phase noise RF generation special attention has to be paid to the implementation of the photodetector 407 and excess noise in the photodetection process has to be minimized. Here the use of a high PRF Yb oscillator or an Er-doped bismuth-oxide oscillator has several advantages. For Er oscillators, the center wavelength of the oscillator around 1550 nm is at the sensitivity maximum of low noise InGaAs PIN-photodetectors allowing high extracted RF powers which limit the shot noise related phase fluctuations. Second, since many applications demand stable RF sources around 10 GHz, it is desirable to extract the highest possible RF power at a harmonic near 10 GHz. The total optical power on the photodetector is limited by detector damage or detector saturation and therefore the total RF power is also limited. Therefore the RF power per PRF harmonic can be maximized by higher PRF which leads to fewer RF harmonics within the detection bandwidth of the photodetector.

Figure 5:
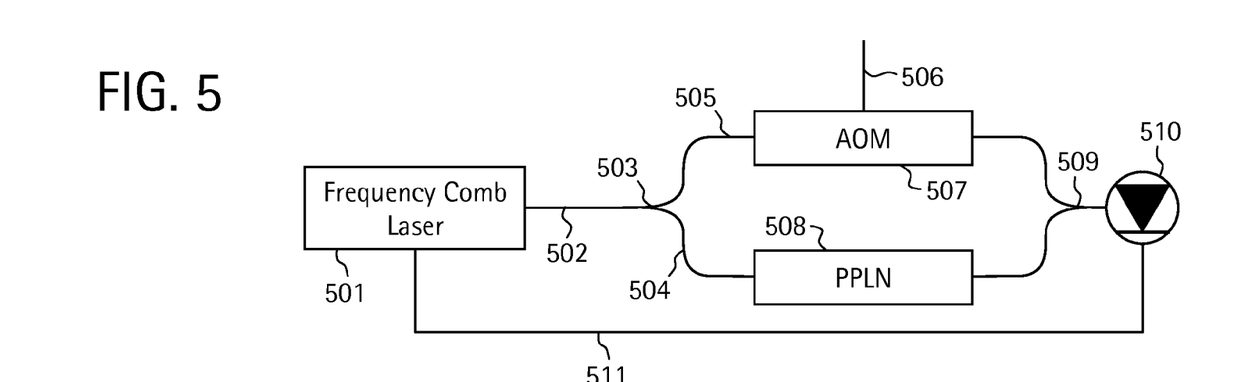
FIG. 5) is a diagram of a phase-stable fiber laser according to an embodiment of the invention.

As described above, the excess noise on the generated supercontinuum can be highly reduced by the use of positively dispersive Bismuth oxide based highly nonlinear fibers for spectral broadening because of the avoidance of Raman solitons. With such a low noise fiber laser based frequency comb, time domain applications of the carrier envelope offset frequency stabilized laser are feasible. FIG. 5 shows a modified f-2f interferometer which allows the stabilization of the carrier envelope offset phase slip to zero. Zero phase slip is advantageous for time domain applications since all the pulses emitted from the oscillator have the same carrier envelope phase. Stabilization to zero carrier envelope offset phase slip is not possible with the standard f-2f interferometer described above since the beat note related to the carrier envelope offset phase slip overlaps with the intermode beat related to the PRF. In the modified f-2f interferometer the output 502 of the frequency comb laser 501 is split by the fusion splitter 503 which is preferably a WDM splitter. The low frequency part of the octave spanning spectrum in output 504 is frequency doubled by a nonlinear crystal 508 and combined with the high frequency part of the spectrum from output 505 which is frequency shifted by a modulator 507 which is driven by a stable RF frequency 506. The two arms of the interferometer are combined by fusion splitter 509 and the beat frequency is detected on a photo detector 510. The beat note related to the carrier envelope offset phase slip is now frequency shifted by the driving frequency of the modulator 506 and can be separated by an RF filter from the intermode beat signals related to the PRF at zero carrier envelope offset phase slip. This enables the use of a feedback control loop 511 for stabilizing the carrier envelope offset phase slip to zero.

Phase-stabilized pulses can be used to resonantly enhance the pulse energy in a passive external cavity downstream from the frequency comb laser. In this application, the resonant enhancement cavity has the same round-trip time as the time separation between the pulses, which are input to the resonant enhancement cavity. With such resonant enhancement cavities, absolute pulse phase stabilization of the pulses is not required, rather it is sufficient to stabilize the comb laser modes to the cavity such that they spectrally overlap with the cavity resonances over a significant part of the comb laser spectral envelope, as for example described by R. Jason Jones et al. in "Precision stabilization of femtosecond lasers to high-finesse optical cavities", PHYSICAL REVIEW A 69, 051803(R) (2004). In the scheme by Jones et al., the reflected signal from the input coupler into the enhancement cavity can be used as error signal for two feedback loops to stabilize both PRF and the CEO related frequency offset of the femtosecond oscillator/amplifier comb to the enhancement cavity. Such a stabilization scheme can replace the f-2f interferometer. The stabilization method described in U.S. Pat. No. 6,038,055 to Hansch et al. only uses one feedback loop which is not sufficient to control both PRF and CEO phase. Alternatively to stabilize the frequency comb laser PRF to the cavity mode spacing, the cavity mode spacing can be stabilized to the frequency comb PRF for example by translating a cavity mirror.

Figure 9A:
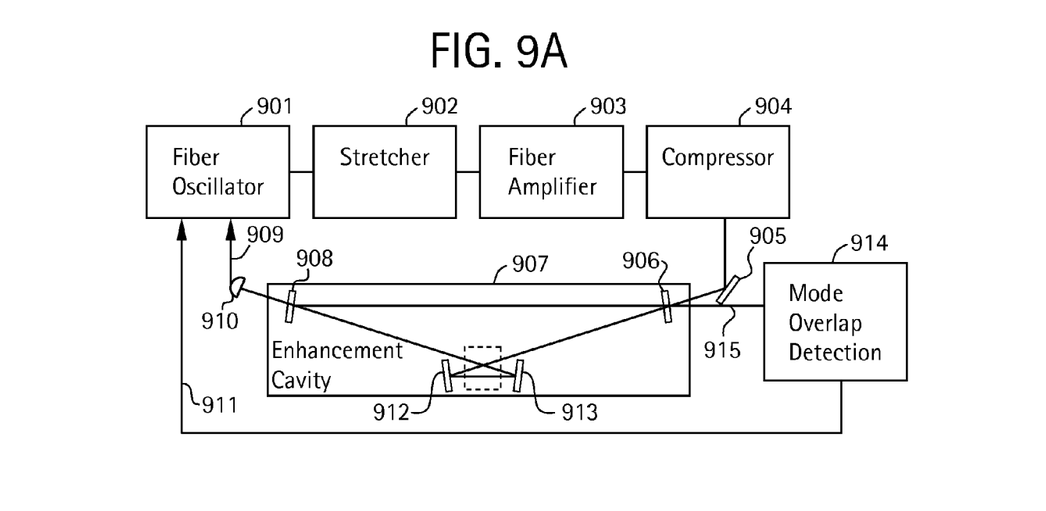
FIG. 9) is a diagram of a fiber frequency comb which is passively enhanced in pulse energy by an external cavity.

FIG. 9 shows an embodiment of a frequency comb laser stabilized to an enhancement cavity. The frequency comb laser consists of a dispersion compensated fiber oscillator 901 of similar design to the oscillator 120 described above and a fiber amplifier 903. To reduce the non-linear phase shift related to pulse amplification, chirped pulse amplification is implemented, i.e. a pulse stretcher 902 is used before amplification and a pulse compressor 904 compresses the pulses after amplification. Fiber chirped pulse amplification systems were previously described in U.S. Pat. No. 6,885,683 and do not need to be further discussed here.

The output of the frequency comb laser is coupled into the enhancement cavity through an input coupling mirror 906. The enhancement cavity is formed by this input coupling mirror and additional high reflector mirrors 908, 912 and 913. For optimum impedance matching, the transmission of the input coupling mirror is approximately equal to the sum of all other cavity losses. The optical beam path 915 contains combined radiation which is coupled out or reflected by the input coupling mirror 906. A spectrally narrow selected part of this radiation can be used to generate the error feedback signal for example according to the method described in "Laser frequency stabilization by polarization spectroscopy of a reflecting reference cavity" by Hansch and Couillaud, in Optics Communications, Volume 35, Issue 3, p. 441-444 (1980). The feedback signal 911 is used to control the oscillator PRF and therefore align the oscillator comb spacing to the cavity comb spacing within the above spectrally selected part. For CEO stabilization either a second spectral part can be selected and the feedback can be implemented in a similar way as the PRF feedback, or the leakage radiation through a high reflector mirror which is on average proportional to the intracavity average power can be detected by a slow photodetector 910 and used for feedback control for CEO stabilization, where typically only a slow bandwidth feedback loop is required in this particular application. Since the cavity modes are only equidistantly spaced for zero intracavity dispersion, preferably low dispersion or dispersion compensating mirror coatings are used and the cavity is placed inside an evacuated enclosure 907.

Two of the cavity mirrors can be curved to form an intracavity focus which can be used to reach very high field intensities. As disclosed in "Phase-coherent frequency combs in the vacuum ultraviolet via high-harmonic generation inside a femtosecond enhancement cavity" Phys Rev Lett., 2005. 94(19): p. 193201 by Jones et al. this can be used for the generation of VUV, EUV and XUV radiation by inserting an inert gas at the intra-cavity focus. Alternatively, another nonlinear material can be inserted at the intra-cavity focus to induce a nonlinear interaction to generate an output at frequency-shifted wavelengths. For example a nonlinear crystal such as PPLN or GaAs can be inserted at the focus for THz generation. The enhancement cavity can thus greatly increase the efficiency of THz generation compared to schemes where no enhancement cavities are used. Equally a parametric amplifier crystal can be inserted at the intra-cavity focus to enable the amplification of pulses at different wavelengths from the pump wavelength. Since the enhancement cavity greatly increase the pump signal intensity at the intra-cavity focus, parametric amplification to greatly enhanced pulse energies compared to single-pass schemes is enabled. Optionally added nonlinear materials such as gases or nonlinear crystals are indicated by dotted outline in FIG. 9.

The system disclosed by Jones et al has the disadvantage that bulk solid state oscillators are used which are limited in average powers due to thermal effects. This is greatly reduced by using fiber amplifier systems.

The amplification of a cw master oscillator by multiple parallel fiber amplifiers and the coherent addition of the amplifiers by feedback phase control was disclosed for example by Augst et al. in "Coherent beam combining and phase noise measurements of ytterbium fiber amplifiers" in Optics Letters, Vol. 29, Issue 5, pp. 474-476 (2004) and references therein. However in the publication by Augst et al. continuous wave radiation was amplified and therefore limited peak powers were reached.

Figure 9B:
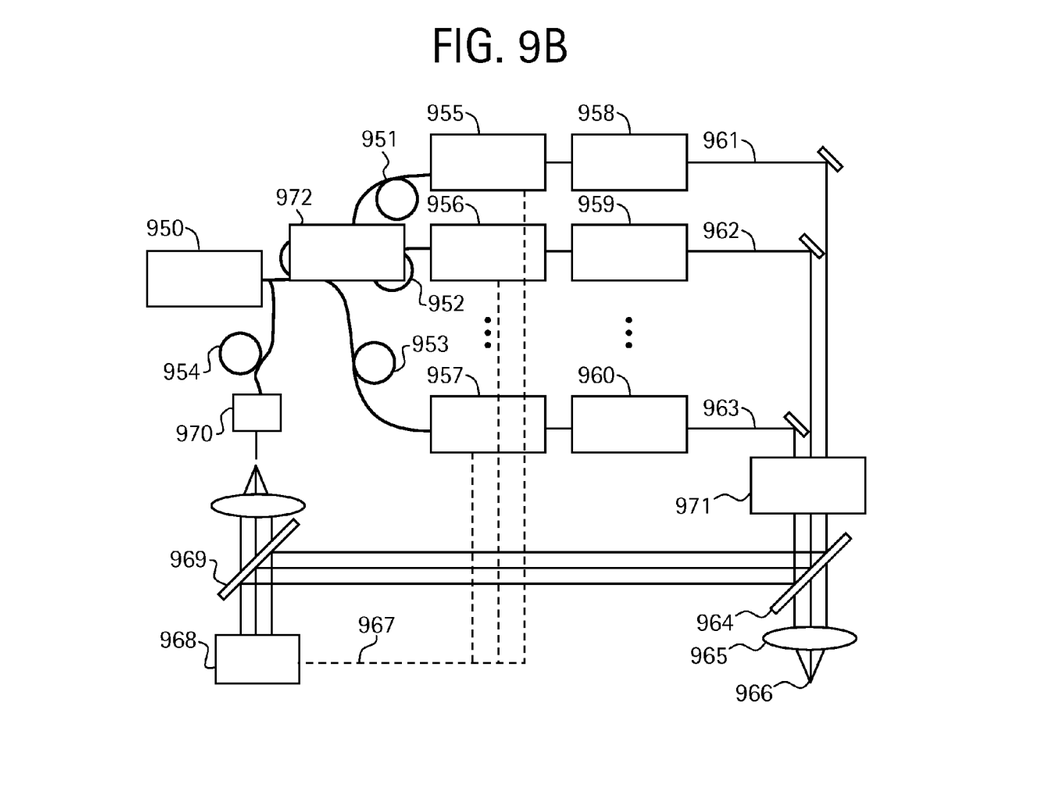
FIG. 9b) is a diagram of an amplified fiber frequency comb with multiple parallel amplifiers which are coherently combined.

FIG. 9b shows an embodiment of an amplified frequency comb oscillator with multiple parallel amplifiers which are phase-coherently combined. Here, in contrast to Augst et al., short pulses are amplified in parallel and coherently added with the advantage of much higher combined pulse peak power.

The output of the oscillator 950 is stretched by the stretcher 972 and split into multiple parts which are delivered by fibers 951, 952 and 953 to the optical delay stages 955, 956 and 957 which provide controllable path length delay (which can be realized by mechanical delay for coarse delay, and/or acousto optical modulators). The output of the delay stages is amplified in fiber amplifiers 958, 959 and 960 which can be represented as separate amplifier fibers or active cores of a multi-core amplifier fiber. In this embodiment three delay stages and amplifier stages are shown as an example only, any number of amplifier stages can be implemented. The outputs of the amplifier fibers are tiled, which can be either accomplished by arranging the amplifier fibers in an array and collimating with a lens array or individually collimating the amplifier fibers and tiling the beams with mirror optics as shown in the figure. The tiled beam can be compressed in the compressor 971 and focused by a lens 965 onto a target 966. A small fraction of the tiled off beam is picked off by the partial reflector 964 and combined with a part of the oscillator output which is split off into the fiber 954 to act as a reference beam, and is optionally frequency shifted by an acousto-optical modulator 970. The delay between the reference beam and the amplifier output beams is detected in the phase sensor and pulse detector array 968. Feedback signals are thus generated for the delay stages 955, 956 and 957 in a way that maxima of the pulse envelopes of the individually amplified pulses coincide at the target 966 and the electrical fields coherently add up. The phase sensor array can be implemented, for example, by optical cross-correlation measurement, RF heterodyne beat detection or optical interferometry. Also a small cw laser at a different wavelength can for example be injected via a beam splitter into stretcher 972. The phase of the cw signal of the output of the amplifier array 955-957 can then be stabilized to allow for coherent addition of the pulsed output of the amplifier array. Such an implementation is not separately shown.

Figure 6:
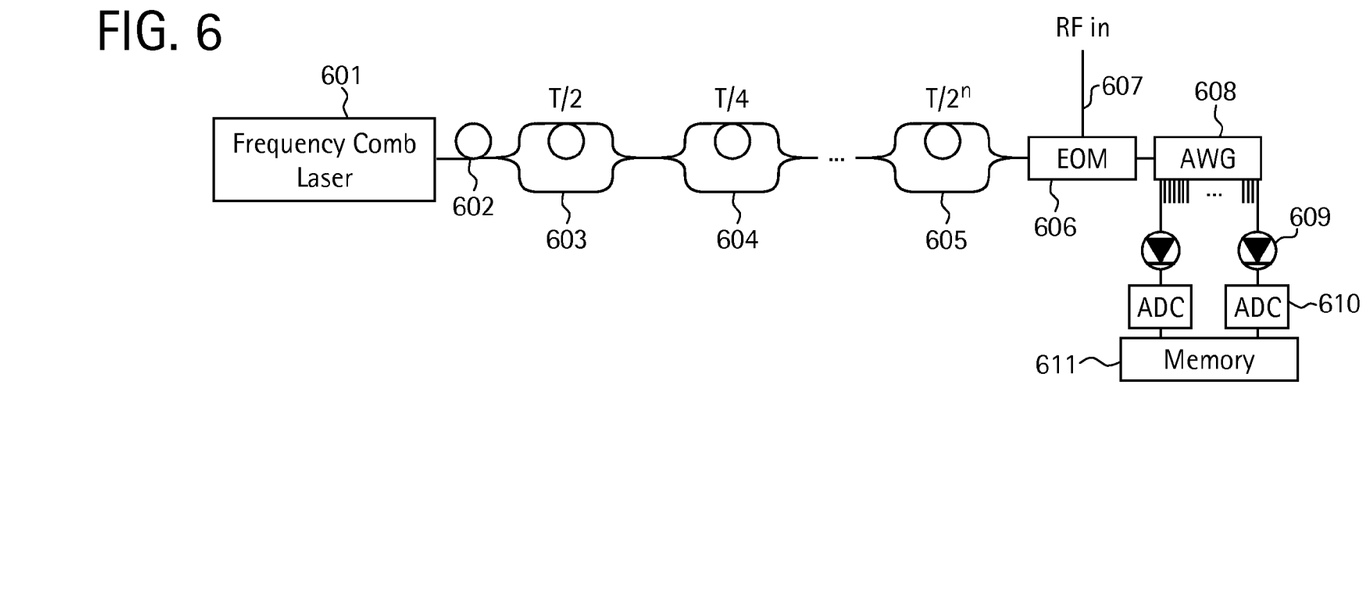
FIG. 6) is a diagram of a fiber based analogue/digital converter according to an embodiment of the invention.

FIG. 6 shows an embodiment using the fiber based frequency comb laser as a clock for a photonic sampler for A/D conversion. Photonic samplers for A/D conversion are discussed in A. S. Bhushan et al. "150 Gsample/s wavelength division sampler with time-stretched output," Electron. Lett., vol. 34, no 5, pp. 474-475, 1998. One of the limiting factors of the described system is the timing jitter of the optical source providing the sampling pulses. The above described frequency comb laser has the advantage of low timing jitter due to a truly dispersion compensated cavity design. In this exemplary embodiment the spectrum of the frequency comb laser 601 is chirped by a dispersive element 602. To enhance the sampling rate to a factor of n of the oscillator PRF a (n−1)-stage optical delay line 603-605 is used. Such a differential optical delay line is current state of the art and needs no further description.

In another embodiment the differential delay line precedes the dispersive element. The RF signal to be sampled 607 is encoded on the optical signal by a modulator 606. The optical signal is then split into m multiple wavelength channels by an arrayed waveguide grating 608. The optical signal of each channel is detected by a photodetector 609 and digitized by m standard A/D converters 610 (only two such A/D converters are shown for simplicity). Since the optical pulses are chirped, the RF signal is encoded on different wavelengths at different times. Therefore the channels of the AWG grating provide a time interleaved sampling of the RF signal. By using an AWG grating with m channels divided over the optical bandwidth of the laser source the sampling rate requirements for the A/D converters 610 is only the fraction of m of the overall system sampling rate. The data of all A/D converters is combined in the memory 611.

Figure 7A:
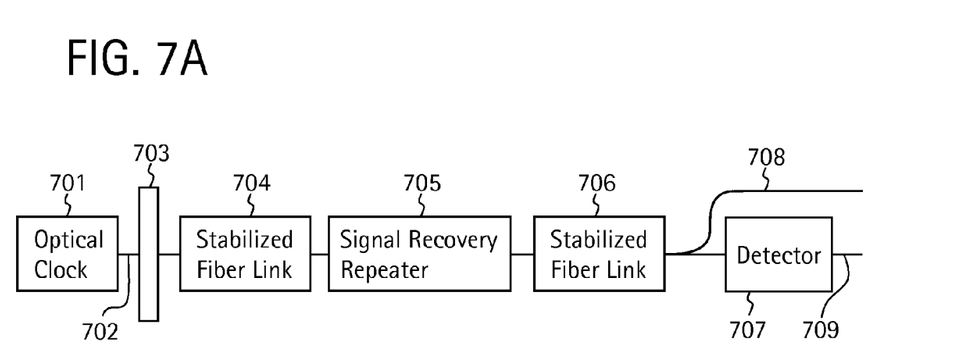
FIG. 7a) is a diagram of a fiber system for the transmission/distribution of frequency standards along fiber transmission lines.

The frequency and time standards provided by frequency comb systems can further be distributed over long distances via fiber optical transmission lines. FIG. 7a) shows such an embodiment of a fiber optic timing and wavelength distribution system comprising an optical clock 701, as described with respect to FIG. 4, which feeds an optical comb signal into the distribution system, sections of stabilized fiber links 704,706, signal recovery repeaters 705 and a photodetector 707. In general the timing distribution system contains multiple sections of stabilized fiber links and signal recovery repeaters. The distribution system may also contain optical fiber amplifiers between stabilized fiber links. It is also possible to have branches, eg. one signal recovery repeater or optical amplifier can feed multiple stabilized fiber links. The purpose of a fiber optic timing distribution system is to transmit the timing and wavelength information encoded in the frequency comb signal at the optical input 702 to a remote location via output port 708 with little deterioration in timing and wavelength information. The optical input port 702 can be for example connected to optical output port 408 of the optical clock shown in FIG. 4. The optical input signal fed into port 702 contains timing information which can be extracted by detecting the intermode beat signal of the frequency comb lines as well as wavelength information realized by the individual comb lines.

The optical input signal can be bandpass filtered by filter 703 to reduce the optical bandwidth and consequently to reduce pulse broadening due to dispersion in the stabilized fiber links. The timing information can be extracted via a low phase noise RF signal at the output port 709 by detecting the intermode beat with detector 707. In another embodiment only the timing information is transmitted in the distribution system and the wavelength information is discarded at the signal recovery repeaters.

The maximum length of the stabilized fiber link sections is limited as will be shown below. The implementation of signal recovery repeaters allows expansion of the total length of the fiber optic timing and wavelength distribution system beyond the maximum length of a single stabilized fiber link.

Figure 7B:
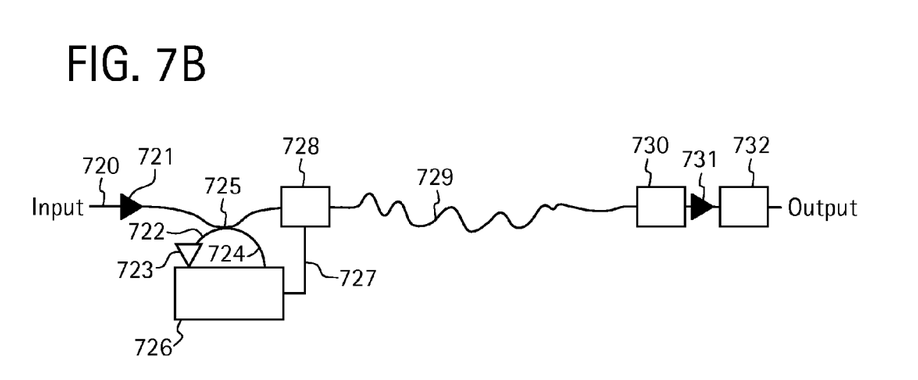
FIG. 7b) is a diagram of an optical path length-stabilized fiber link.

FIG. 7b) shows an embodiment of a stabilized optical fiber link. Other implementations of stabilized fiber links are for example disclosed in K. W. Holman, D. D. Hudson, J. Ye, and D. J. Jones, "Remote transfer of a high-stability and ultralow-jitter timing signal," Opt. Lett. 30, 1225-1227. (2005). The embodiment shown in FIG. 7b) comprises an input port 720, a timing jitter or phase noise detector system 726, a feedback loop 727, an optical delay line 728, a transmission fiber 729, a partial reflector 730, dispersion compensating elements 732 and optical isolators at input and output ends 721 and 731. The feedback loop 727 controls the optical delay in delay line 728 in such a way that the optical path length of the optical transmission fiber 729 is constant. The error signal is generated by reflecting back part of the transmitted signal by the partial reflector 730, coupling it out via fiber coupler 725 at the input end and comparing it with part of the input signal 724. The back-reflected signal can be optically amplified by the optical amplifier 723. The timing jitter detector 726 can be realized by an optical cross correlator or an electronic phase noise sensor comprising photodetection of the forward and back-reflected light at ports 724 and 722, RF amplifiers, phase shifters and mixers. Interferometric detectors sensing the optical phase difference between port 722 and 724 are also possible. The detector 726 measures the error signal caused by optical path length fluctuations of the transmission fiber 729. Since the signal at port 724 double-passes the fiber 729 the detector detects approximately twice the path length error of the single-pass transmitted light over the transmission fiber 729 and the control signal has to be corrected for this fact by dividing the error signal by two, ensuring optical path length stabilization for single-pass light through the transmission fiber 729. In another embodiment the back-reflected light from partial reflector 730 is back-transmitted in a different optical fiber exposed to approximately the same environmental conditions as the forward transmitting fiber 729. For example both fibers can be part of one fiberoptical cable. In this case the "backward fiber" can be directly connected to detector 726 and only a small part of the forward transmitted light needs to be coupled out at fiber coupler 725. In this embodiment unidirectional fiberoptic amplifiers can be inserted in the forward transmission fiber 729 and the backward transmitting fiber. In another embodiment an optical circulator can be used to separate forward and backward transmitted light, replacing the fiber coupler 725. In yet another embodiment, a Faraday rotator can be inserted immediately before the partial reflector 730. This has the advantage that polarization mode dispersion of the fiber 729 is compensated for the double pass light used for error signal generation and the coupler 725 can be replaced by a polarizing beam splitter. The fiber port 722 may include dispersion compensating elements to compensate the dispersive pulse broadening of the back-reflected light. Also dispersion compensating elements 723 (e.g., dispersion compensating fiber, grating compressors, fiber Bragg grating compressors) may be inserted. Part or all of the dispersion of fiber 729 can also be pre-compensated at the input port or at any intermediate point of the transmission line. The delay line 728 can consist of free space delay, fiberoptic stretchers, heated fibers or phase modulators. The partial reflector 730 can consist of Fresnel-reflectors at the fiber end, dielectric coatings, fiber Bragg gratings or fiber loop mirrors. In the case of fiber Bragg gratings, these can be chirped in order to compensate dispersion for the back-reflected light.

Because the optical signal used for error signal generation needs to double pass the transmission line, the most rapid optical path length fluctuations which can be compensated corresponds to the round trip time of the optical signal $2*n*L/c$, where n is the group index of the transmission fiber, L the transmission fiber length and c the speed of light. This relation limits the practical length of the transmission fiber. To extend this length, signal recovery repeaters or optical amplifiers are inserted between sections of stabilized fiber links in the timing and wavelength distribution system.

Figure 7C:
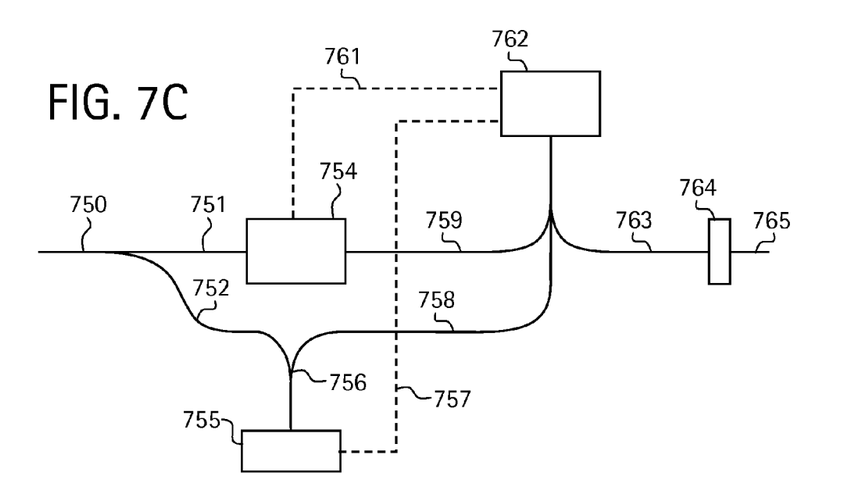
FIG. 7c) is a diagram of a signal recovery repeater for an optical frequency comb.

FIG. 7c) shows an embodiment of a signal recovery repeater, regenerating a phase coherent copy of the input optical frequency comb 750 at the output port 765. Previously, the phase coherent stabilization of two femtosecond frequency comb lasers has been disclosed; for example in T. R. Schibli, J. Kim, O. Kuzucu, J. T. Gopinath, S. N. Tandon, G. S. Petrich, L. A. Kolodziejski, J. G. Fujimoto, E. P. Ippen, and F. X. Kaertner, "Attosecond active synchronization of passively mode-locked lasers by balanced cross correlation," Opt. Lett. 28, 947-949 (2003), or in A. Bartels, N. R. Newbury, I. Thomann, L. Hollberg, and S. A. Diddams, "Broadband phase-coherent optical frequency synthesis with actively linked Ti:sapphire and Cr:forsterite femtosecond lasers," Opt. Lett. 29, 403-405. (2004). However none of the prior art phase coherently stabilizes a frequency comb laser to a fiber-transmitted optical frequency comb.

The signal recovery repeater comprises a frequency comb laser 762, detectors for repetition rate stabilization 754, CEO frequency stabilization 755 and feedback loops 761 and 757 for repetition rate and CEO stabilization. Part of the optical input signal from port 750 and part of the optical output signal of the frequency comb laser 762 are connected to repetition rate detector 754. The repetition rate detector can consist of an electronic phase locked loop comprising photodetectors, RF-amplifiers, RF bandpass filters, phase detectors and loop filters, or an optical cross-correlator. Also a combination of electronic and optical detection can be of advantage, since the electronic detector has a larger capture range and the optical cross correlator has higher phase sensitivity. The electronic detector can be used for first coarse locking and slow drift stabilization in conjunction with an optical cross correlator driving a fast actuator. Once the repetition rate or equivalently the comb spacing of the frequency comb laser 762 is stabilized to the input frequency comb via the detector 754 and the feedback loop 761, the CEO frequency of laser 762 can be stabilized to the input frequency comb 750. This is done by combining part of the light of the input frequency comb with part of the light from the frequency comb laser 762 in a fiber coupler 756 and detecting a RF beat signal at a photodiode 755. Since the mode spacing of the input frequency comb and the frequency comb laser 762 is already equal, the intermode beat signal of both frequency combs overlaps. In addition to the intermode beat signal, a beat signal corresponding to the difference of the CEO frequency of input frequency comb 750 and frequency comb laser 762 is detected. Using this stabilization scheme, neither an octave spanning bandwidth nor an f-2f interferometer is required for the frequency comb laser 762. Laser 762 can be realized by a mode-locked fiber oscillator with repetition rate and CEO phase control inputs. The beat signal related to the CEO frequency difference can be stabilized by feedback controlling the frequency comb laser 762 via the control loop 760 to an offset frequency, most conveniently a fraction of the intermode beat signal. The frequency of the optical comb lines of frequency comb laser 762 will then be shifted by this offset. This shift can be alternatively compensated by frequency shifting one of the input ports of coupler 756 by the same amount with an acousto optical modulator.

Alternatively, if wavelength transmission is not required, the CEO offset detection and stabilization can be omitted. The wavelength information can be regenerated from the timing information at the end of the transmission line using a frequency comb laser.

One part of the optical output of frequency comb laser 762 is transmitted to port 763, optionally bandpass filtered with filter 764 and transmitted to the output port of the signal recovery repeater 765. This signal can now be transmitted in a subsequent stabilized fiber link.

Figure 8:
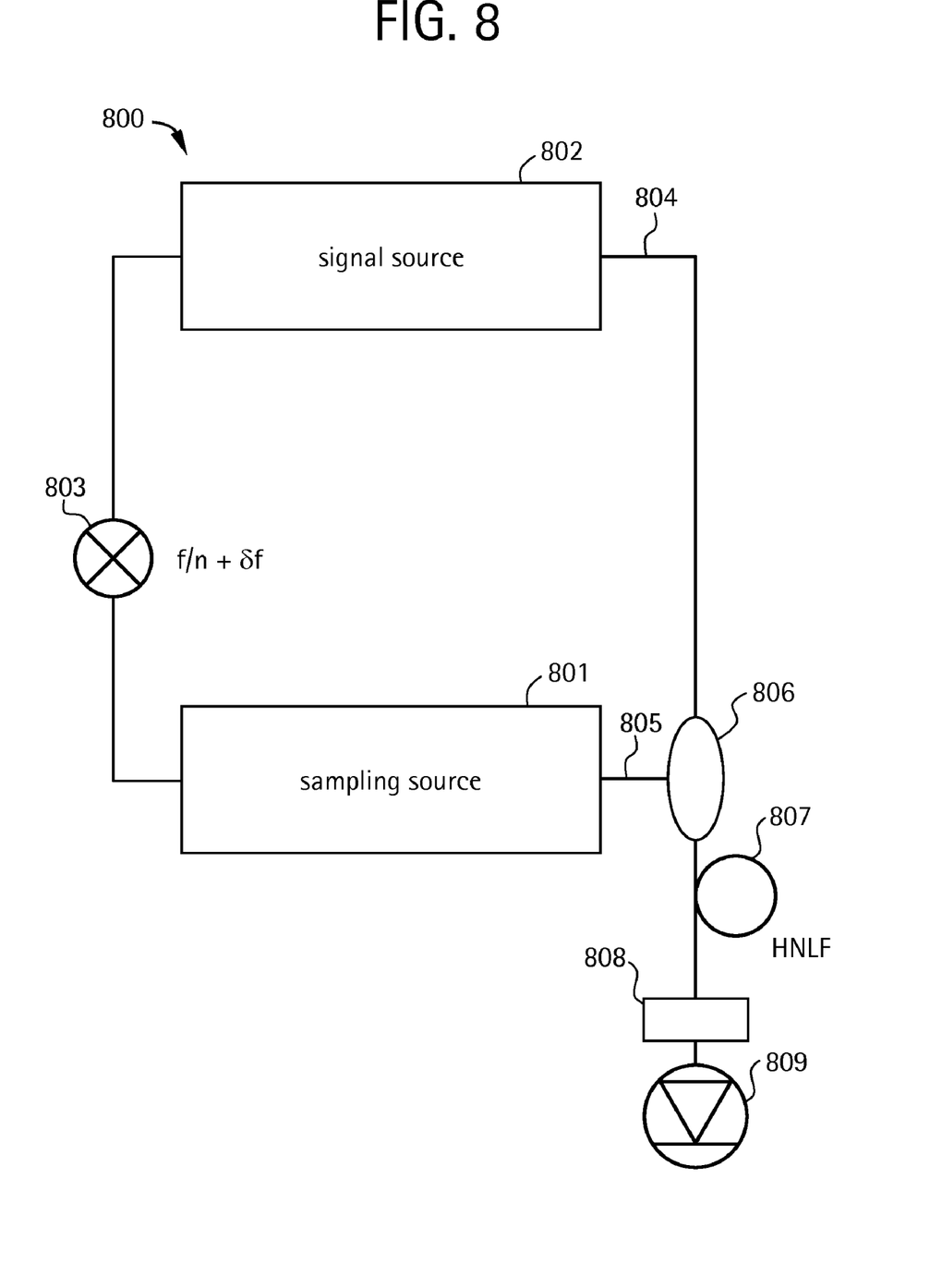
FIG. 8) is a diagram of a fiber optical sampling unit according to an embodiment of the invention.

Finally, in addition to optical A/D converters, the fiber lasers described above are also ideal for the construction of optical sampling units required for the measurement of high bit rate signal sources as used in telecommunications. The implementation of a generic optical sampling unit 800 is shown in FIG. 8. The sampling source 801 represents a high repetition rate pulse source as described in the '302 publication. When using Bi—Er fiber, the sampling source 801 can be operated at wavelengths in the range from 1500-1530 nm. The sampling source is typically operated at a frequency $f/n+\delta f$, which is slightly offset from an integer fraction of the frequency f of the signal source 802 to be sampled. Signal source 802 can for example be a repetitive train of pulses at a repetition rate of 40 GHz. The sampling frequency of $f/n+\delta f$ is derived from signal source 802 and generated in an electronic mixer and frequency shifter 803; the sampling frequency is then used to control the repetition rate of sampling source 801, which is electronically locked to the sampling frequency $f/n+\delta f$. Alternatively, no electronic locking between signal source 702 and sampling source 801 is required to sample the data train from signal source 802. The optical output 804 from signal source 802 is combined with the output 805 from sampling source 801 in a wavelength division multiplexing coupler 806. For example the signal pulse train can be at a wavelength of 1560 nm and the sampling pulse train can be at a wavelength of 1520 nm. Four wave-mixing in a length of highly nonlinear fiber 807 is then used to generate a data output at a wavelength near 1480 nm. The data output contains the information of the sampled signal pulse train at the reduced frequency of $\delta f$. The data output originates from the nonlinear interaction between the signal pulse train at 1560 nm and the sampling pulse train at 1520 nm. The data output is conveniently filtered out by filter 808 and detected by detector 809. The output from detector 809 can then be digitized and processed to represent the signal pulse train using conventional techniques well known in the state of the art. The advantage of Bi-fiber based sampling sources is that signal sources in the whole spectral range of the central band of telecommunications from 1530-1570 nm can be sampled with a Bi-fiber operating at wavelengths <1530 nm or at wavelengths >1570 nm. These extreme wavelengths are not easily accessible with standard modelocked sources based on silica fibers.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A source of phase-stable optical pulses, comprising;
   a modelocked fiber laser;
   a multi-core fiber amplifier comprising an array of individual fiber amplifiers arranged so as to amplify an output of said mode locked fiber laser, said individual amplifiers being configured to produce said individual outputs;
   at least one phase sensor to detect the phase of outputs of said individual amplifiers; and
   at least one phase stabilizer to stabilize the phase of said individual amplifiers, said stable phase being obtained at the output of said fiber amplifier array, said stable phase being characterized in that the relative phase fluctuations between individual amplifiers is smaller than 1 rad.

2. The source of phase-stable optical pulses according to claim 1, wherein a relative phase of said individual outputs is controlled to smaller than 0.1 rad with said phase stabilizer.

3. The source of phase-stable optical pulses according to claim 1, further comprising:

individual phase-adjusters operating on all but one of said individual amplifiers; and an electronic control loop to lock the phase of said all but one individual amplifiers to the remaining individual amplifier, which is used as a reference for the electronic control loop.

4. The source of phase-stable optical pulses according to claim 1, further comprising:

a pulse stretcher disposed between said modelocked fiber laser and said multicore fiber amplifier, wherein stretched output pulses from said stretcher are spatially split into multiple beams and delivered to individual fiber amplifiers of said multicore fiber amplifier; and a pulse compressor disposed downstream from said multicore fiber amplifier, said compressor arranged in such a way as to receive stretched and amplified output pulses from said individual amplifiers of said multicore fiber amplifier, and to compress said stretched and amplified pulses received therefrom.

* * * * *